United States Patent [19]

Lechner

[11] Patent Number: 4,672,424
[45] Date of Patent: Jun. 9, 1987

[54] PROGRESSIVELY SCANNED TELEVISION SYSTEM WITH REDUCED CHROMINANCE BANDWIDTH

[75] Inventor: Bernard J. Lechner, Mercer County, N.J.

[73] Assignee: RCA Corporation, Princeton, N.J.

[21] Appl. No.: 701,528

[22] Filed: Feb. 14, 1985

[51] Int. Cl.$^4$ .................................... H04N 11/06
[52] U.S. Cl. ............................. 358/11; 358/14
[58] Field of Search ........................ 358/11–14

[56] References Cited

U.S. PATENT DOCUMENTS

| | | | |
|---|---|---|---|
| 2,921,124 | 1/1960 | Graham | 358/138 |
| 2,921,211 | 1/1960 | Toulon et al. | 358/64 |
| 3,051,778 | 8/1962 | Graham | 358/133 |
| 3,073,894 | 1/1963 | De France | 358/14 |
| 3,200,195 | 8/1965 | Davies et al. | 358/133 |
| 3,541,244 | 11/1970 | Law | 358/138 |
| 3,571,494 | 3/1971 | Law et al. | 358/21 R |
| 3,795,763 | 3/1974 | Golding et al. | 358/13 |
| 3,889,288 | 6/1975 | Rennick | 358/14 X |
| 4,090,214 | 5/1978 | Wright | 358/14 X |
| 4,323,916 | 4/1982 | Dischert et al. | 358/13 |
| 4,376,948 | 3/1983 | Dischert et al. | 358/13 |
| 4,517,597 | 5/1985 | Glenn | 358/13 |
| 4,520,386 | 5/1985 | Asaida | 358/13 |
| 4,531,151 | 7/1985 | Hentschke | 358/13 X |
| 4,574,300 | 3/1986 | Hulyer | 358/12 X |
| 4,583,113 | 4/1986 | Pritchard | 358/12 X |
| 4,593,315 | 6/1986 | Willis et al. | 358/11 X |

OTHER PUBLICATIONS

The Paper Entitled "High Definition Television Studies on Compatible Basis with Present Standards" by Broder Wendland appearing on pp. 151–165 of the Book (A Collection of Papers) entitled Television Technology in the 80's published by SMPTE.
The article entitled "High Resolution NTSC Television System" by F. H. Dill appearing on pp. 2148–2153 of the IBM Technical Disclosure Bulletin, vol. 21, No. 5, Oct. 1978.
P. 55 of the article entitled "The new Television: Looking Behind the Tube" by T. E. Bell appearing in the IEEE Spectrum, Aug. 1984.
The article entitled "High-Definition TV Signal Fits on One Channel with Interpolation of Missing Pixels" appearing in Electronics, Feb. 23, 1984.
The translation for the German language article "Possibilities of Digital Coding and Transmission of Color Television Signals" by Ludwig Stenger and Gunther Wengenroth appearing on pp. 321–325 of German language magazine NTZ 1971.

*Primary Examiner*—John M. Jillions
*Attorney, Agent, or Firm*—Eugene M. Whitacre; Paul J. Rasmussen; Peter M. Emanuel

[57] ABSTRACT

A high definition television signal for use in a studio production facility is formed by scanning an image in progressive rather than interlaced fashion to form luminance and first and second color-difference signals and by reducing the resolution of the color-difference signals in both the horizontal and vertical directions but leaving the resolution of the luminance signal substantially unaltered.

20 Claims, 15 Drawing Figures

Y = ○
C1 = △   C2 = □

Y = ○
C1 = △   C2 = □

○ = Y
△ = C1
□ = C2

○ = Y
△ = C1'
□ = C2

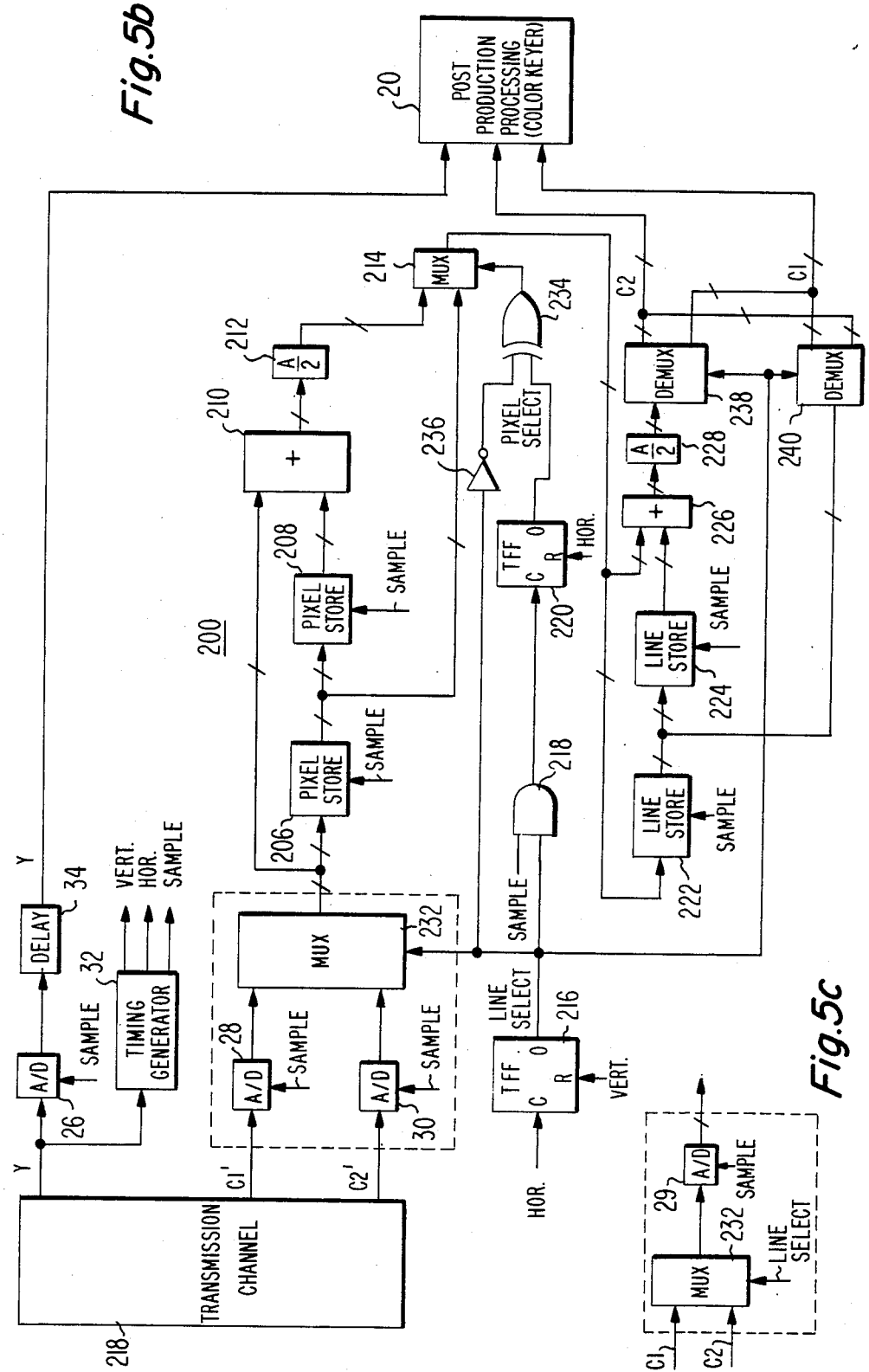

PROGRESSIVELY SCANNED TELEVISION SYSTEM WITH REDUCED CHROMINANCE BANDWIDTH

The present invention concerns a high definition television (HDTV) system utilizing progressive (rather than interlaced) scanning with a reduced bandwidth for chrominance information.

There is an ever increasing interest in high definition (HDTV) television. For home receivers compatible with existing television transmission standards this means improving the subjective resolution of the images reproduced from the transmitted television signals. Typically, this involves the creation of additional horizontal scanning lines from the ones transmitted either by replication or interpolation. For studio production the object is to make the resolution of images reproduced from television signals comparable with images reproduced from film, typically, 35 mm film, so that the less expensive and more flexible television signal processing and recording production techniques may replace film production techniques.

Various HDTV production systems or signal formats (standards) have been proposed. Usually, these proposed HDTV production systems require increasing the actual number of horizontal scanning lines and typically also increasing the number of picture elements (pixels) per horizontal scanning line. Both measures result in increased bandwidth. The practical limits of the transmission, recording and proposing apparatus to which the HDTV signal is subject constrains its bandwidth. Thus, all of the proposed HDTV production systems involve a compromise between resolution and bandwidth.

One proposed television production system, known as CCIR recommendation 601, is an interlaced system in which, as in the existing television transmission systems, each image frame is organized into two time sequential fields of horizontal scanning lines which are interlaced in space. In this sytem the resolution is increased by increasing the number of scanning lines per field and the number of pixels per scanning line. Compared to noninterlaced or progressive scanning systems, in which each frame includes only a single field containing all the scanning lines of the frame, the bandwidth of an interlaced scanning system is reduced by the number of fields per frame, e.g., two. To reduce the bandwidth of this system further, the information for alternate pixels in each line are deleted. The CCIR 601 format is shown in FIG. 1, in which scanning lines of one field are represented by solid lines and scanning lines of the next field are represented by broken lines, luminance pixels are represented by circles and color-representative pixels C1 and C2, e.g., R-Y and B-Y or I and Q, are represented by triangles and squares.

It has been proposed to modify CCIR recommendation 601 to reduce bandwidth still further by completely deleting alternate lines of color information in each field as shown in FIG. 2. However, this modification has been shown to be unacceptable for studio production use since it does not lend itself well to certian post production processes such as color keying. Color keying involves identifying the areas containing a particular color, e.g., blue, in an image so that another image may be substituted in those areas. For example, when it is desired to show an object or person in a particular environment, e.g., space, the object or person is placed in front of a blue screen and color keying is used to replace the blue screen with an image of the desired environment. Analog and digital color keying systems ar described in U.S. Pat. No. 4,408,221 issued to McCoy in Oct. 4, 1983 and U.S. Pat. No. 4,488,167 issued to Yamamoto on Dec. 11, 1984, respectively. Color keying requires the identification of the boundary of the areas to be substituted in each line of the image. Thus, for color keying, when pixels and/or lines of color information have been deleted, it is desirable to replace them either by interpolation or replication of adjacent pixels and adjacent lines prior to color keying. However, as indicated in FIG. 2, in the modified version of CCIR recommendation 601, adjacent lines of color information are spacially separated by four lines within each field. Under these circumstances it has been found that the restoration of missing color information is too inaccurate for acceptable color keying.

Another proposed HDTV production system utlilizes progressive scanning. Progressiive scanning is superior to interlaced scanning in many respects since adjacent lines of the frame are separated in time by the reciprocal of the line rate rather than the much larger reciprocal of the field rate of an interlaced system with a comparable number of lines per frame. Considering that stationary images are rare, perhaps the most significant advantage of progressive scanning over interlaced scanning is dynamic resolution in the vertical direction. Dynamic resolution concerns the ability to faithfully represent details in the image containing motion. Despite the advantage of progressive scanning in HDTV production systems, the increased bandwidth penalty compared to interlaced scanning has been considered too great for acceptance.

Proposals have been made for generating HDTV signals for transmission compatible with existing transmission standards and therefore compatible with existing television receivers by progressively scanning an image and prior to transmission deleting alternative pixels and alternate lines of picture information. The article entitled "High Definition Television Studies on Compatible Basis with Present Standards" by Broder Wendland appearing on pages 151-165 of the collection of papers presented during the 15th Annual SMPTE Television Conference in San Francisco, Calif., Feb. 6-7, 1981, *Television Technology in the 80's* published by the Society of Motion Picture and Television Engineerings in 1981 discusses the effects of the deletion of alternate pixels and lines of the "video signal" and the article entitled "High Resolution NTSC Television System" by F. H. Dill appearing on pages 2148-2153 of the *IBM Technical Disclosure Bulletin*, Vol. 21, No. 5, October 1978 discusses the deletion of "every other resolution position and every other line of a high resolution image." However, these proposals, which are concerned with compatibility with existing transmission standards, do not specifically deal with chrominance information or distinguish between luminance and chrominance information with respect to the deletion of pixels and lines of information.

It is herein recognized desirable to provide a television signal which may be used in studio production processing by progressively scanning an image and thereafter deleting alternate pixels of at least one color representative signal (or producing the same effect by low pass filtering) for one of each pair of adjacent scanning lines and completely deleting the color representative signal for the other (alternate) line of each pair of adjacent scanning lines but leaving the luminance representative signal substantially as it was produced by progressive scanning. In this manner, the bandwidth can be constrained sufficiently for transmission, recording or processing within the production facility without significant loss of dynamic resolution conveyed primarily by the luminance signal and with sufficient color resolution for satisfactory post production processing including color keying. Various formats according to the present invention are possible such as are described with reference to FIGS. 4 and 5.

These and other features of the invention will be described with reference to the accompanying Drawing in which:

FIGS. 1 and 2, previously described, show the television signal formats for CCIR recommendation 601 and a modification thereto, respectively;

FIGS. 5a and 5b show a digital encoder and a digital decoder, respectively, for the television signal format shown in FIG. 5 and FIG. 5c shows a modification to the decoder shown in FIG. 5b;

In the various FIGURES, corresponding elements are identified with the same reference number. In addition, for simplicity digital signal paths are indicated by single lines. However, they are distinguished from analog signal paths by short diagonal slashes.

Figure 3:
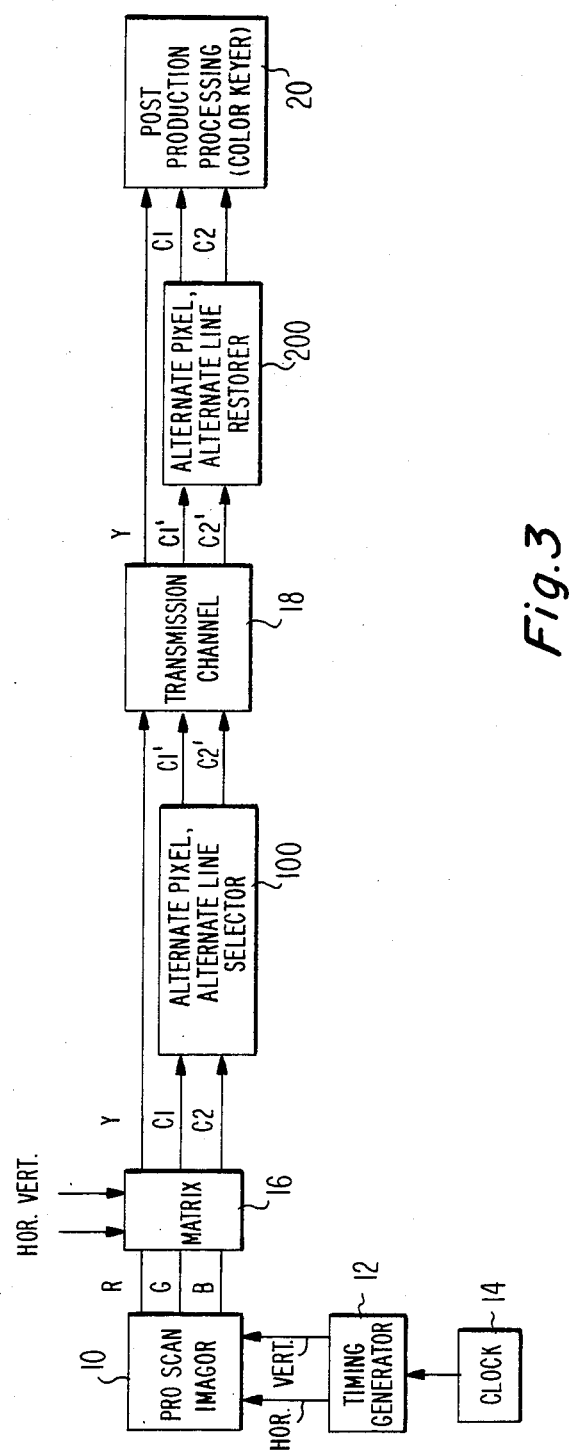
FIG. 3 shows a studio production system utilizing a television signal format according to the present invention.

The television production system shown in FIG. 3 includes a television camera comprising a progressive scanning imager 10 for scanning a scene to produce red (R), green (G) and blue (B) baseband color signals simultaneously during the horizontal scanning lines of progressively scanned frames in response to horizontal and vertical synchronization signals generated by a timing generator 12 from clock signals provided by a clock oscillator 14. In comparison to an interlaced frame, each progressively scanned frame has spatially adjacent horizontal scanning lines occurring in the same field rather than spatially adjacent horizontal scanning lines or occurring sequentially in time in different fields. Imager 10 may include either an imaging tube or a solid state imager. In the latter case, sampling signals for transferring charge packets representative of each pixel would also be provided to imager 10 from timing generator 12. Desirably, the number of horizontal scanning lines per frame (field) is greater than the number of scanning lines per field in the comparable transmission standard for improved vertical resolution and, in the case of a solid state imager, the number of pixels or samples per horizontal scanning line is also increased to increase the horizontal resolution. It is also desirable that the aspect ratio be different from that of the comparable transmission standard to be more like that of film.

The R, G and B signals produced by imager 10 are combined in a matrix 16 to form a luminance signal Y and two color-difference signals C1 and C2 such as R-Y and B-Y or I and Q. Matrix 16 also adds horizontal and vertical synchronization pulses to the Y signal to mark the beginning of each frame and the beginning of each scanning line. Since matrix 16 is merely an additive mixer, Y, C1 and C2 signals produced at the output of matrix 16 all have the same bandwidth.

The Y, C1 and C2 signals are coupled through a transmission channel 18, which may comprise a distribution network or a recording/playback system such as a magnetic tape recorder, to a post production processing unit 20 which performs operations such as color keying and the like. To substantially preserve the detail resolution, especially the dynamic detail resolution, made possible by progressive scanning, the luminance information is coupled to production processing unit 20 substantially unaltered in bandwidth. If the chrominance information were also coupled to production unit 20 substantially unaltered in bandwidth the total bandwidth of the television information would be $$\text{TOTAL BW} = \text{BWY} + \text{BWC1} + \text{BWC2} = 3\text{BWY} \tag{1}$$

However, in the production system shown in FIG. 3, to reduce the total bandwidth, for each pair of adjacent horizontal scanning lines, alternate pixels of color-difference signals C1 and C2 are deleted on one line and completely deleted on the other line as is shown, for example, in FIG. 4 or FIG. 5 (to be described in greater detail below) by an alternate pixel, alternate line selector 100 prior to coupling to transmission channel 18. This has the effect of reducing the bandwidth of the color-difference signals C1 and C2 relative to the bandwidth of the luminance signal Y by a factor of four. That is, the color-difference signals C1' and C2' produced by alternate pixel, alternate line selector 100 have reduced bandwidths relative to the luminance signal Y given by $$\text{BWC1}' = \tfrac{1}{4}\text{BWY} \tag{2}$$

$$\text{BWC2}' = \tfrac{1}{4}\text{BWY} \tag{3}$$

and the resulting total bandwidth is given $$\text{TOTAL BW} = \text{BWY} + \tfrac{1}{4}\text{BWY} + \tfrac{1}{4}\text{BWY} = 1.5\ \text{BWY} \tag{4}$$

Thus there is a fifty percent reduction in total bandwidth.

Figure 2:
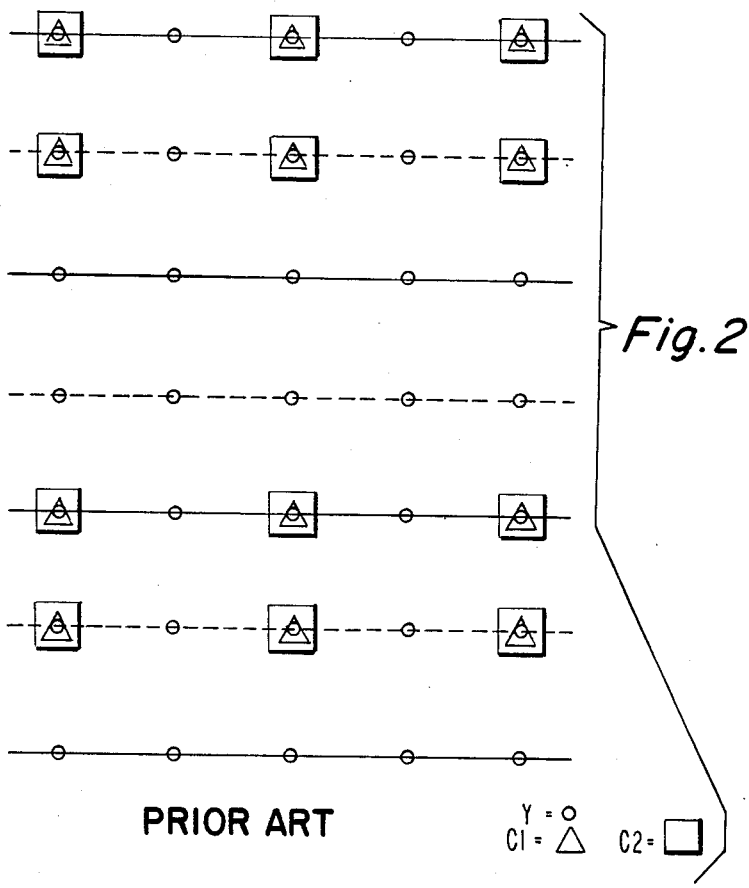

After transmission 18 and before post production processing unit (20) the deleted chrominance information is "restored" from the remaining chrominance information by a restorer unit 200, as will be described in detail, below for the purpose of operations such as color keying. The bandwidth reduction by deletion of alternate pixels and alternate lines of pixel information without jeopardizing post production processing operations such as color keying is possible when the image is formed by progressive scanning rather than by interlaced scanning (as earlier discussed) since sufficiently accurate chrominance information restoration in the vertical, as well as in the horizontal direction, is possible. This is so because, referring to FIGS. 4 and 5, in the vertical direction pixels adjacent to the discarded pixels are available for restoration of the discarded pixels and are essentially no more than one line away both in space and in time as compared with the four line spatial separation or one field temporal separation of the interlaced system shown in FIG. 2.

Figure 4:
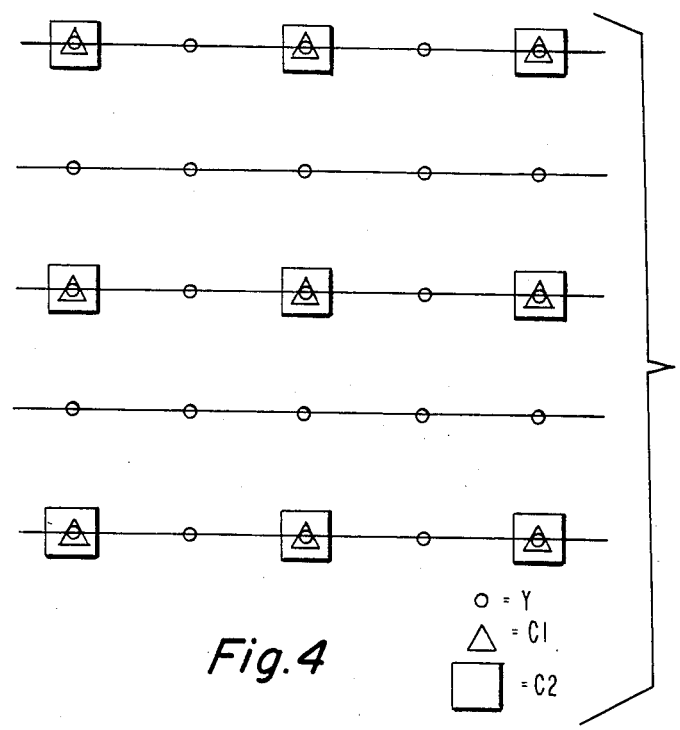
FIGS. 4 and 5 show alternate television signal formats in accordance with the present invention.

In the signal format shown in FIG. 4, samples of both of the color-difference signals C1 and C2 are deleted for the same alternate pixels for one of each pair of adjacent horizontal scanning lines (e.g., for the odd horizontal lines) and the samples of both color-difference signals C1 and C2 are completely deleted for the other one of each pair of adjacent horizontal scanning lines (e.g., for the even horizontal lines). A digital encoder embodying alternate pixel, alternate line selecter 100 and a digital decoder embodying alternate pixel, alternate line restorer 200 for the signal format shown in FIG. 4 suitable for use in a production facility utilizing digital signal processing are shown in FIGS. 4a and 4b, respectively.

Figure 4A:
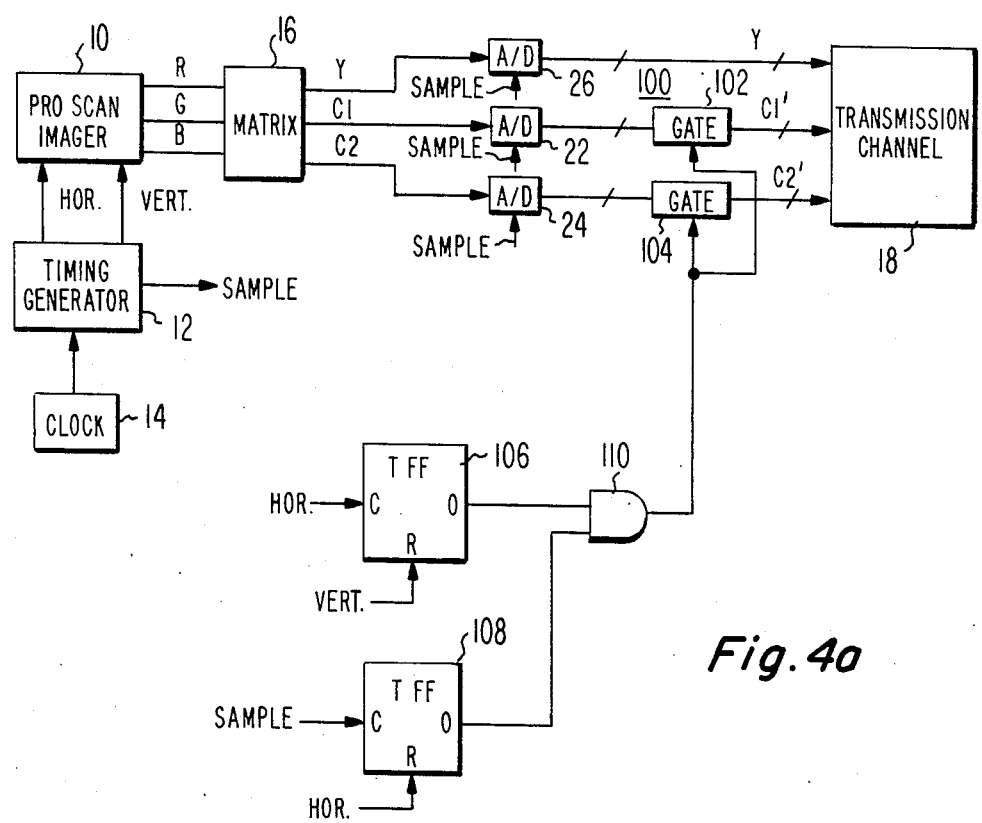
FIGS. 4a and 4b show a digital encoder and a digital decoder, respectively, for the television signal format shown in FIG. 4.

In the production facility shown in FIG. 4a, the Y luminance signal and the C1 and C2 color-difference signals are converted to serial streams of digital samples by respective analog-to-digital (A/D) converters 20, 22 and 24 which receive sampling pulses from timing signal generator 12. The frequency of the sampling pulses determines the number of pixels per horizontal scanning line. Alternate pixel, alternate line selector 100 comprises plural bit gate circuits 102 and 104, each comprising one transmission gate per bit, coupled between respective outputs of A/D converters 22 and 24 and transmission channel 18 and having their control inputs connected together. Gate circuits 102 and 104 are normally opened and, therefore, only coupled the digital C1 and C2 samples to transmission channel 18 when caused to do so by the application of the high logic level of a control signal to their commonly connected control inputs. The control signal is produced by a logic network comprising toggle flip-flops (FFs) 106 and 108 and an AND gate 110. Toggle FF 106 is reset at the beginning of every frame by the vertical synchronization pulses. After the vertical synchronization pulse for a frame, toggle FF 106 is caused to produce the high logic level at its output for the first and every other horizontal line thereafter and the low logic level at its output for the second and every other horizontal line thereafter in response to the horizontal synchronization pulses. Toggle FF 108 operates in a similar manner to toggle FF 106 and is reset at the beginning of every horizontal line by the horizontal synchronization pulses and thereafter caused to alternately produce the high and low logic levels at its output in response to the sampling pulses. The output signals of FFs 106 and 108 are coupled to respective inputs of AND gate 110. The control signal for gate circuits 102 and 104 is produced at the output of AND gate 110 and alternately switches between the high and low logic level at the sampling frequency for every other horizontal line of a frame starting from the first line.

If the Y, C1' and C2' signals are transmitted or recorded in analog form, respective digital-to-analog (D/A) converters are provided in transmission channel 18.

Figure 4B:
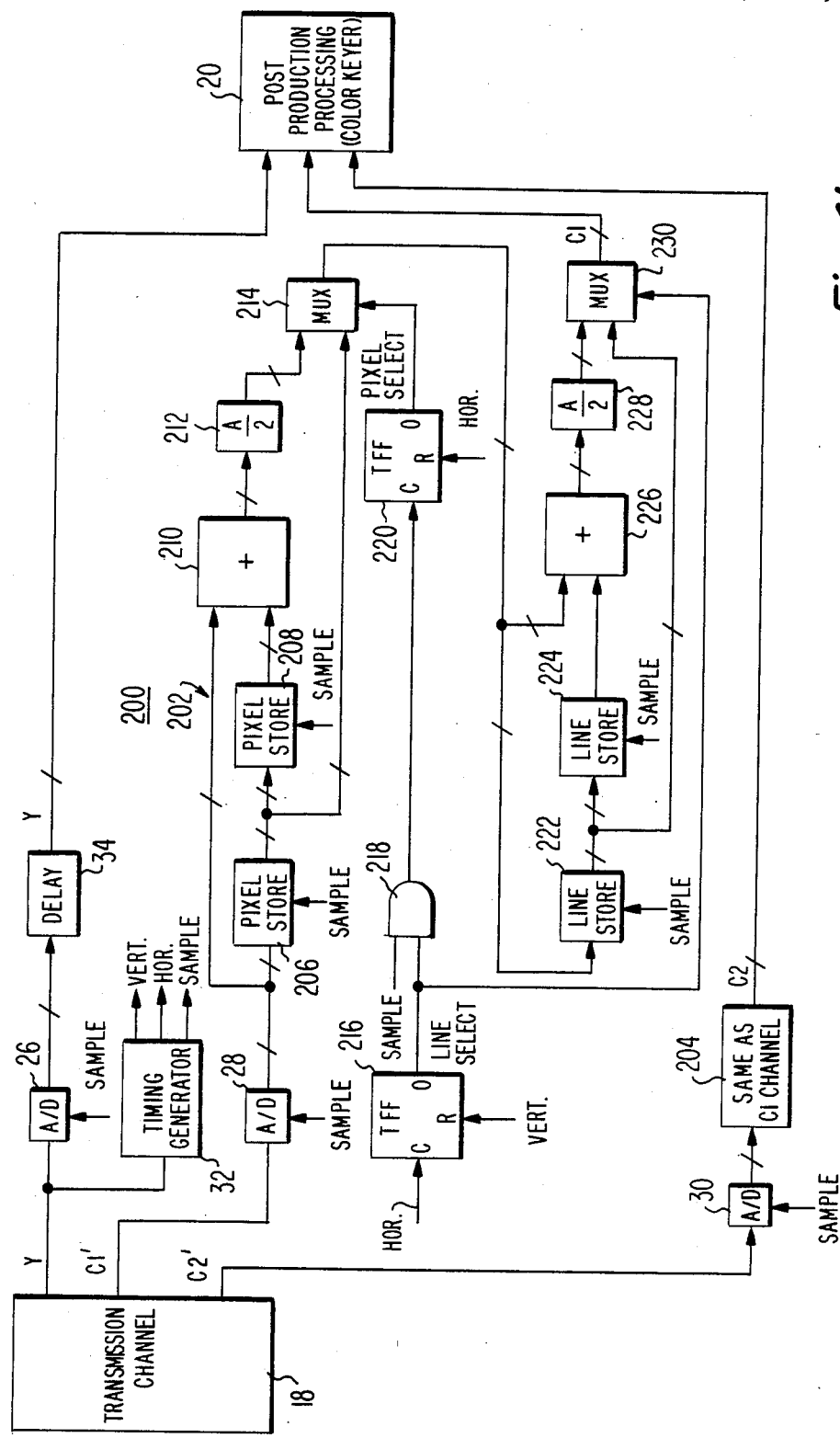

As shown in FIG. 4b, if the Y, C1' and C2' signals are transmitted or recorded in analog form, the Y, C1' and C2' signals received from transmission channel 18 are again converted to digital form by A/D converters 26, 28 and 30, respectively, before further processing. A timing generator 32 derives the vertical and horizontal synchronization pulses from the Y signal and sampling pulses for A/D converters 26, 28 and 30 from the horizontal synchronization pulses, e.g., by means of a phase locked loop. Since sections 202 and 204 of alternate pixel, alternate line restorer 200 for C1 and C2 signals, respectively, are the same, only section 202 for signal C1 will be described in detail.

In section 202, the digital C1' samples produced by A/D converter 28 are coupled in sequence to pixel stores 206 and 208 in response to the sample pulses. Pixel stores 206 and 208 simply each comprise a group of bit latches which store respective bits of the digital sample present at their inputs when a sample pulse occurs. Pixel stores 206 and 208, a digital adder 210 and a digital divide-by-two attenuator 212 (formed by simply shifting each bit position to the right) form an averaging circuit for replacing each missing pixel of a line by averaging the respective two adjacent pixels. At each pixel position, a multiplexer 214 selects the real pixel stored in a pixel store 206 in response to the high logic level of a "pixel select" control signal or the average or interpolated pixel produced at the output of adder 210 in response to the low logic level of the pixel select control signal.

The pixel control signal for multiplexer 214 is produced by a toggle FF 216, and AND gate 218 and a toggle FF 220. Toggle FF 216 is reset at the beginning of every frame by the vertical synchronization pulses and thereafter caused to produce the high logic level of a "line select" control signal at its output for alternate lines starting with the first and the low logic level of the line select control signal at its output for alternate lines starting with the second in response to the horizontal synchronization pulses. AND gate 218 receives the sample pulses at one input and the line select signal produced by toggle FF 216 at the other input and thus produces sample pulses at its output only for alternate lines starting with the first. Toggle FF 220 is reset at the beginning of each line by the horizontal synchronization pulses and thereafter alternately produces high and low logic levels for controlling multiplexer 214 in response to the sampling pulses produced by AND gate 218.

Line stores 222 and 224, comprising plural bit shift registers clocked by the sampling pulses, an adder 226 and a divide-by-two attenuator 228, arranged in similar fashion to the pixel interpolator to replace each missing line of C1 by averaging the respective adjacent lines. A multiplexer 230, responsive to the line select signal produced by toggle FF 216, alternately selects the real lines from line store 222 and the averaged or interpolated lines from attenuator 228 starting from the first line of the frame to form restored signal C1.

A delay unit 34 is included in the Y signal processing path to equalize the delays of the Y signal with the C1 and C2 signals. For the embodiment shown in FIG. 4b the appropriate delay of delay unit 34 corresponds to one pixel and one line. Accordingly, delay unit 34 may comprise a pixel store in cascade with a line store.

Figure 5:
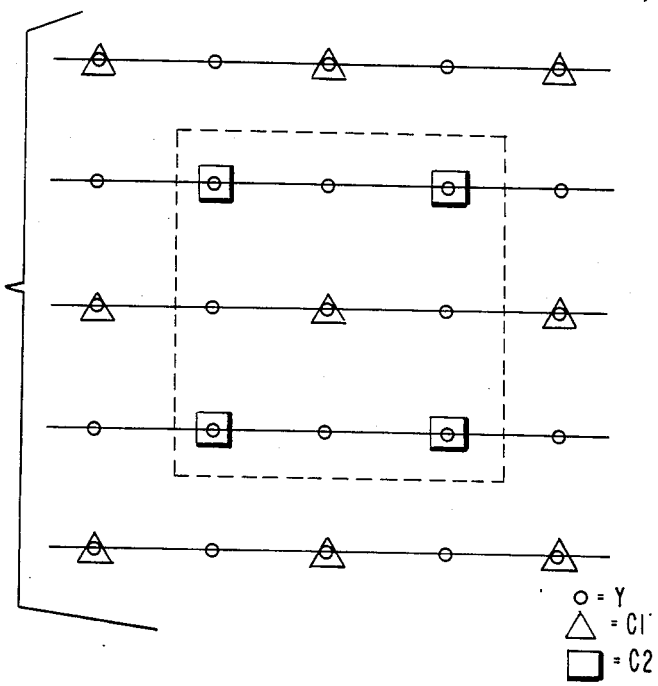

The primary difference between the signal format shown in FIG. 5 and that shown in FIG. 4 is that the color-difference C1 and C2 signals are completely deleted on different alternate lines. That is, the first line and every other line thereafter contains alternate C1 pixels and the second and every other line thereafter contains alternate C2 pixels. The signal format shown in FIG. 5 is also different than that shown in FIG. 4 in that the C1 and C2 pixels are not vertically aligned. That is, in the first line and in alternate lines thereafter, alternate C1 pixels are deleted starting with the second pixel and in the second line and in alternate lines thereafter, alternate C2 pixels are deleted starting with the first pixel. Thus, in general, FIG. 5 represents a signal format in which one of odd or even lines one of odd or even pixels of one color component are deleted and in the other of the odd or even lines the other of the odd or even pixels are deleted. Considering groupings of five color-representative components such as encompassed by the dotted line in FIG. 5, the format shown in FIG. 5 may be thought of as a quincunx format.

Figure 5A:
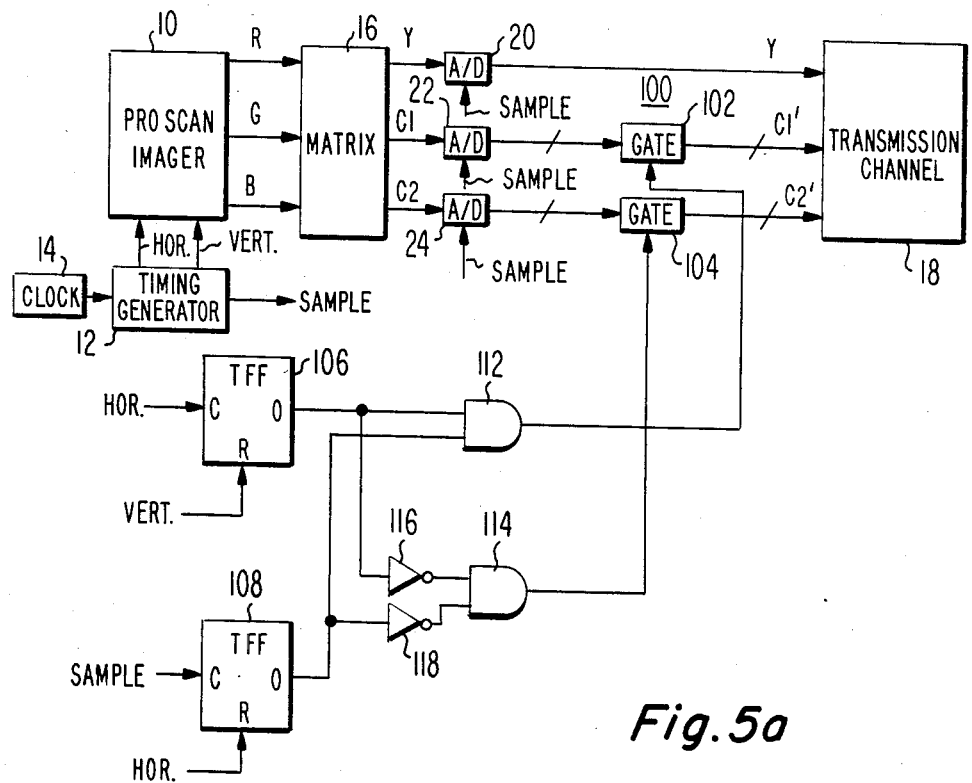

A digital encoder embodiment of alternate pixel, alternate line selector 100 and a digital decoder embodiment of alternate pixel, alternating line restorer 200 suitable for a digital production facility employing the signal format shown in FIG. 5 are shown in FIGS. 5a and 5b, respectively.

The digital encoder shown in FIG. 5a is similar in many respects to the digital encoder shown in FIG. 4a as indicated by elements identified by the same reference numbers. The primary difference between the structures of FIGS. 5a and 4a is that the control inputs of gate circuits 102 and 104 are separately controlled rather than commonly. The control signal for gate circuit 102 is provided by an AND gate 112 which receives its input signals from toggle FFs 106 and 108 corresponding to the same FFs of the structure of FIG. 4a. Gate circuit 102 is controlled so that for every odd line, every even C1 pixel is deleted and for every even line, every C1 pixel is deleted. The control signal for gate 104 is provided by an AND gate 114 which has its inputs coupled by way of INVERTERS 116 and 118 to the outputs of toggle FFs 106 and 108. AND gate 114 and inverters 116 and 118 cause gate circuit 104 to only couple even digital C2 samples to transmission channel 18 in even lines.

The decoder for the signal format shown in FIG. 5 shown in FIG. 5b has many of the same elements of the decoder shown in FIG. 4b as is indicated by the commonly identified elements. The major difference between the decoders shown in FIGS. 4b and 5b is that in the decoder of FIG. 5b alternate pixel, alternate line restorer 200 has only a single section which is used for both of the C1 and C2 signals. More specifically, restorer 200 shown in FIG. 5b includes input and output switching circuitry which enables the use of a common structure to replace the missing even pixels of C1 in odd lines and the missing odd pixels of C2 in even lines and to replace the missing even lines of C1 and the missing odd lines of C2. This time-sharing of one section is made possible because in the signal format shown in FIG. 5 only one of the two color-difference signals C1 and C2 are deleted per line.

In the structure shown in FIG. 5b, an input multiplexer 232 couples the digital C1' samples to the pixel restorer portion comprising pixel stores 206 and 208, digital adder 210 and digital divide-by-two attenuator 212 during odd lines and the digital C2' samples to the pixel restorer portion during even lines in response to the line select signal produced by toggle FF 216. Since even C1 pixels are missing in odd lines (the same as for the signal format of FIG. 4) while odd C2 pixels are missing in even lines, in the pixel restorer portion, an EXCLUSIVE OR gate 234 and an INVERTER 236 are provided to selectively invert the pixel select control signal for pixel multiplexer 214 (which selects between the real pixels stored in pixel store 206 or the averaged or interpolated pixels produced at the output of attenuator 212) for even lines in response to the high logic level of the line select control signal produced by toggle FF 216. In the line restorer portion, comprising line stores 222 and 224, adder 226 and divide-by-two attenuator 228, since the missing C1 lines are even lines while the missing C2 lines are odd lines, a demultiplexer 238 is provided to couple the interpolated lines of information produced at the output of attenuator 228 to a C1 output during even lines and to a C2 otuput during odd lines in response to the high and low logic levels, respectively, of the line select signal and a demultiplexer 240 is provided to couple the real lines of information stored in line store 222 to the C1 output during odd lines and to the C2 output during even lines in response to the high and low logic levels, respectively, of the line select signal.

FIG. 5c shows a modification to the decoder shown in FIG. 5b in which, in order to permit the use of a single A/D converter 29 rather than two A/D converters, as shown in the portion of FIG. 5b encompassed by dotted lines, multiplexer 232 is placed prior to A/D converter 29.

In the digital encoders shown in FIGS. 4a and 5a, the bandwidth of the C1 and C2 signals are reduced, by way of example by a factor of two, compared to the bandwith of the Y signal by deleting digital pixel samples. In the analog encoders shown in FIGS. 6a and 7a, an equivalent bandwidth reduction of the C1 and C2 signals is produced by low pass filtering. As in the digital encoders shown in FIGS. 4a and 5a, in the analog encoders shown in FIGS. 6a and 7a, a further reduction in the bandwidth of the C1 and C2 is accomplished by deleting alternate lines of C1 and C2 information. In the analog decoders shown in FIG. 6b and 7b, the missing lines of the C1 and C2 information are restored by interpolation as in the digital decoders shown in FIGS. 4b and 5b in order to provide the necessary vertical resolution for post production processes such as color-keying. However, in the analog decoders, the C1 and C2 information, in the existing lines of C1 and C2, lost by low pass filtering is not compensated for. However, because of the continuous nature of analog signals, the resolution in the horizontal direction for post production processes such as color-keying and for image reproduction for viewing is sufficient.

Figure 6A:
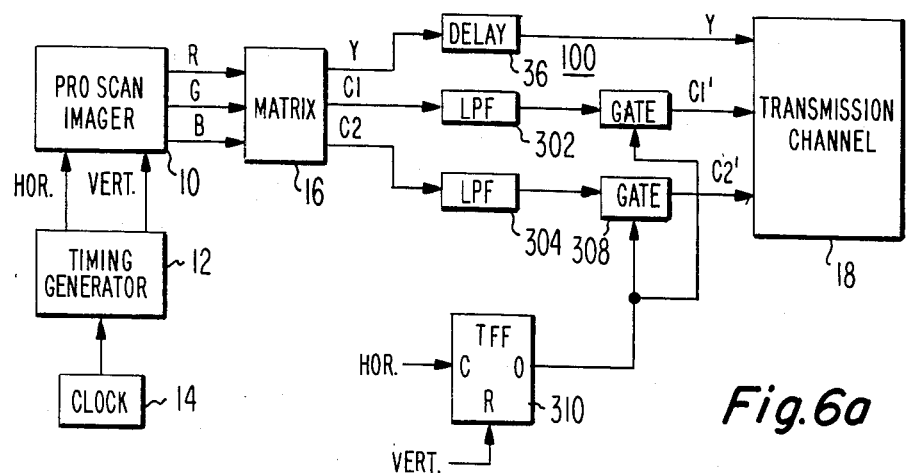
FIGS. 6a and 6b show an analog encoder and an analog decoder, respectively, for the television signal format shown in FIG. 4.

The analog encoder shown in FIG. 6a is arranged to produce the analog equivalent of the digital signal format shown in FIG. 4 (the word digital here meaning the individual treatment of pixels). Low pass filters (LPFs) 302 and 304, which each have a bandwidth of one-half compared with the bandwidth of the luminance signal, reduce the bandwidth of the C1 and C2 signals, respectively, by a factor of two. Analog transmission gates 306 and 308 are simultaneously controlled in response to a control signal produced at the output of a toggle FF 310 to delete both of the C1 and C2 signals for every other horizontal scanning line. A delay unit 36 is introduced in the Y signal path to compensate for the time delay introduced by LPFs 302 and 304.

Figure 6B:
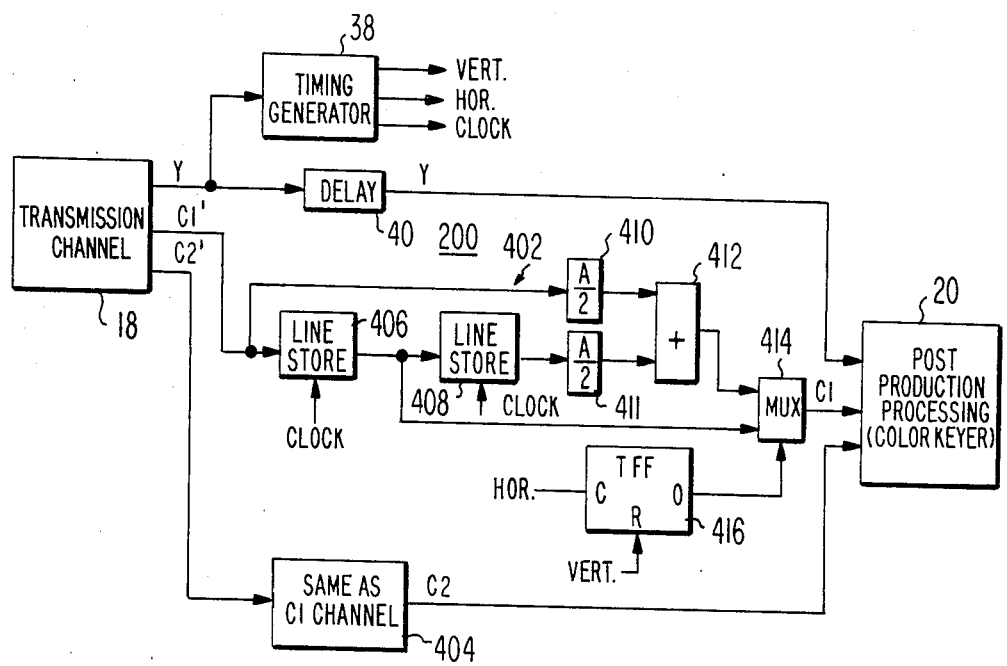

The analog decoder shown in FIG. 6b includes two identical sections 402 and 404 for producing the restored C1 and C2 signals, respectively. Therefore, only section 402 will be described in detail. Section 402 includes a line interpolator comprising analog line stores 406 and 408, analog divide-by-two attenuators 410 and 411 and an analog adder 412 for averaging the respective real C1 lines adjacent to the missing C1 lines in the same manner as the digital counterparts shown in FIGS.

4b and 5b. Analog line stores 406 and 408 may comprise charge coupled delay (CCD) lines the clock signals of which are produced from the horizontal synchronization pulses by a timing generator 38 similar to timing generator 32 of the digital embodiments shown in FIGS. 4b and 5b. Analog attenuators 410 and 411 may comprise a resistive voltage divider an analog adder 412 may comprise a resistive adder. A single divide-by-two attenuator following adder 412 may replace attenuatores 410 and 411 and, in practice, the attenuation and adding functions may be combined in a single resistive matrix. A multiplexer 414 and a toggle FF 416 cooperate in similar manner to multiplexer 214 and toggle FF 216 of the digital embodiments shown in FIG. 4b and 5b to couple the real C1 signal to the C1 output during odd lines and the interpolated C1 signal to the C1 output during even lines. A delay unit 40, e.g., comprising another CCD delay line, is provided in the Y signal path to compensate for the time delay, corresponding to one horizontal line interval imparted to the C1 and C2 signals in their respective paths.

Figure 7A:
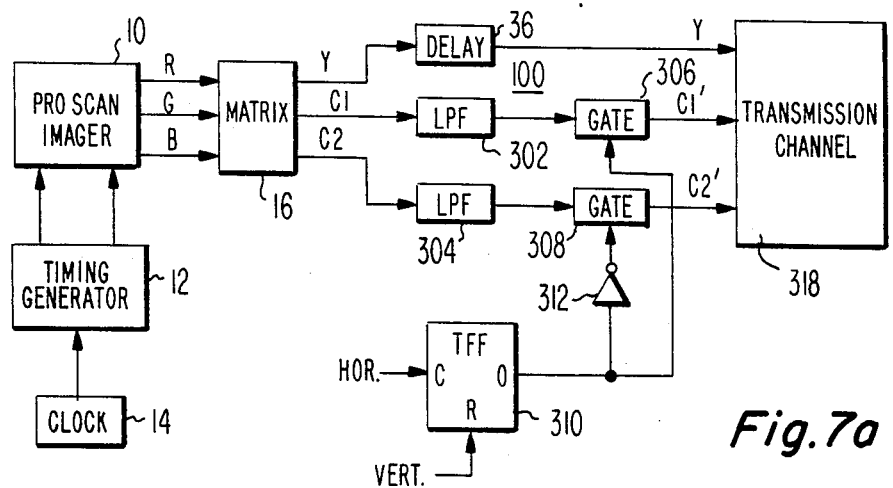
FIGS. 7a and 7b show an analog encoder and an analog decoder, respectively, for the television signal shown in FIG. 5.

The analog encoder shown in FIG. 7a is arranged to produce the analog equivalent of the signal format similar to that shown in FIG. 5 in which the C1 signal is deleted for even lines and the C2 signal is deleted for odd lines. Since pixels are not treated individually but rather by low pass filters 302 and 304, the line by line horizontal shift of the missing pixels shown in FIG. 5 is not produced by the encoder shown in FIG. 7a. The structure shown in FIG. 7a is similar to that shown in FIG. 6a but because the C1 signal is to be deleted on even lines while the C2 signal is to be deleted on odd lines, gates 306 and 308 are individually, rather than jointly, controlled. Specifically, for this reason, the output of toggle FV 310 is directly connected to the control input of gate 306 and coupled through an INVERTER 312 to the control input of gate 308.

Figure 7B:
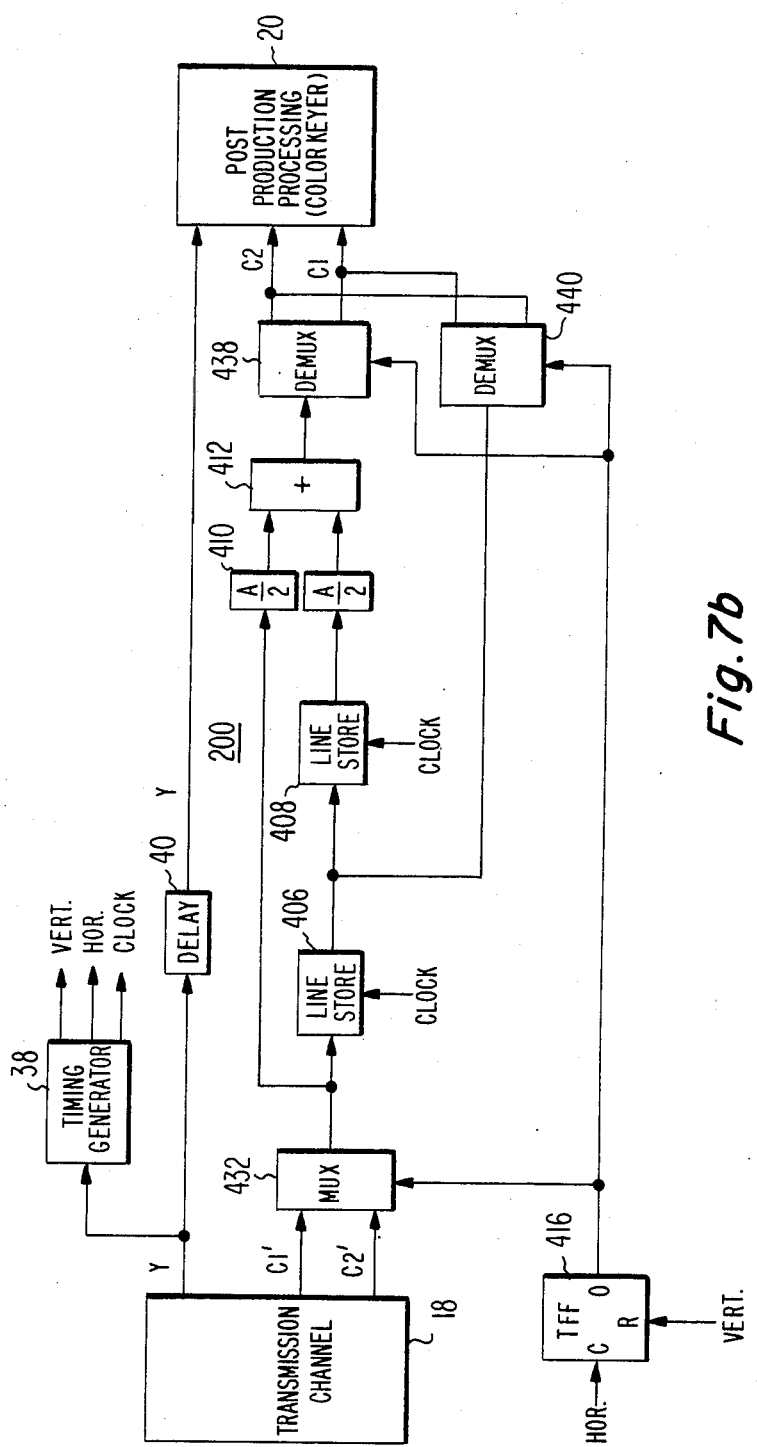

Since the real C1 and C2 signals occur on different lines, in the analog decoder showing in FIG. 7b, as in the digital decoder shown in FIG. 5b, a time-sharing missing line interpolator, comprising line stores 406 and 408, attenuators 410 and 411 and an adder 412 arranged as in the structure of FIG. 6b, is employed. An input multiplexer 432 similar in function to input multiplexer 232 of the digital encoder shown in FIG. 5b and demultiplexers 438 and 440 similar in function to demultiplexers 238 and 240 of the digital decoder shown in FIG. 5b are utilized in the encoder shown in FIG. 7b to provide the input and output switching required for time-sharing the line-interpolation structure.

A number of systems for recording and playing back a conventional interlaced television signal are known in which two color-representative signal components are sequentially recorded in alternate line intervals in order to conserve bandwidth. One such system is described in U.S. Pat. No. 3,717,725 issued to Numakuna on Feb. 20, 1973. Other recording and playback systems for interlaced televisions are known in which the luminance signal and the color-representative signals are recorded on separate tracks in order to conserve bandwidth and also prevent undesirable mixing of the luminance and chrominance information. U.S. Pat. No. 4,376,957 issued to Dischert et al. on Mar. 15, 1983 describes such a system. The present signal format, in which the Y luminance signal and the C1 and C2 color-difference signals are processed separately as components, with either both of the color-difference signals being deleted for the same alternate lines as shown in FIG. 4 or with a different one of the color-difference signals being deleted for alternate lines as shown in FIG. 5, is well suited to a recording system including aspects of both of the aforementioned systems. In this system the luminance information and chrominance information are recorded on respective separate tracks, with the chrominance information being recorded in the form of line alternate color representative signal componants. In this regard it is noted that the signal format shown in FIG. 5 is ready for recording in the aforementioned line-alternate manner since the C1' and C2' signals are alternately produced during successive lines. However, for the signal format shown in FIG. 4, since the C1' and C2' signals are simultaneously produced during alternate lines, during each line in which they are present (that is, during each odd line) one of the C1 and C2 signals must be saved for recording in the next line interval while the other one of the C1 and C2 signals is recorded. The manner in which this may be accomplished is shown in FIG. 8.

Figure 1:
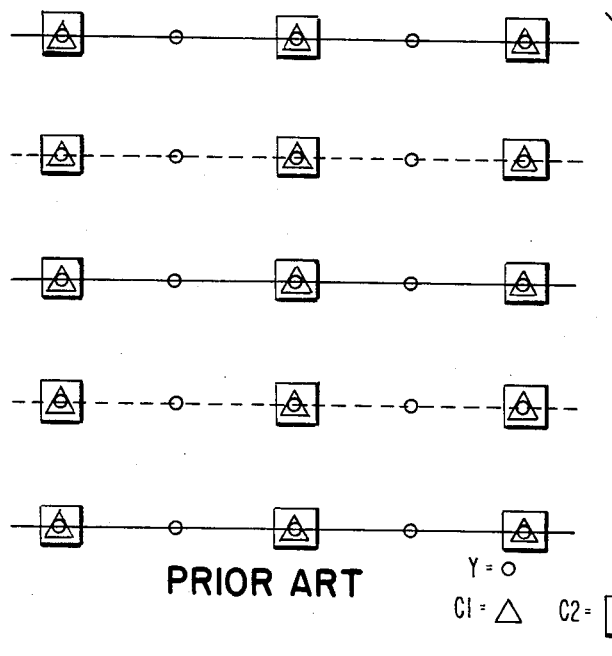
Figure 8:
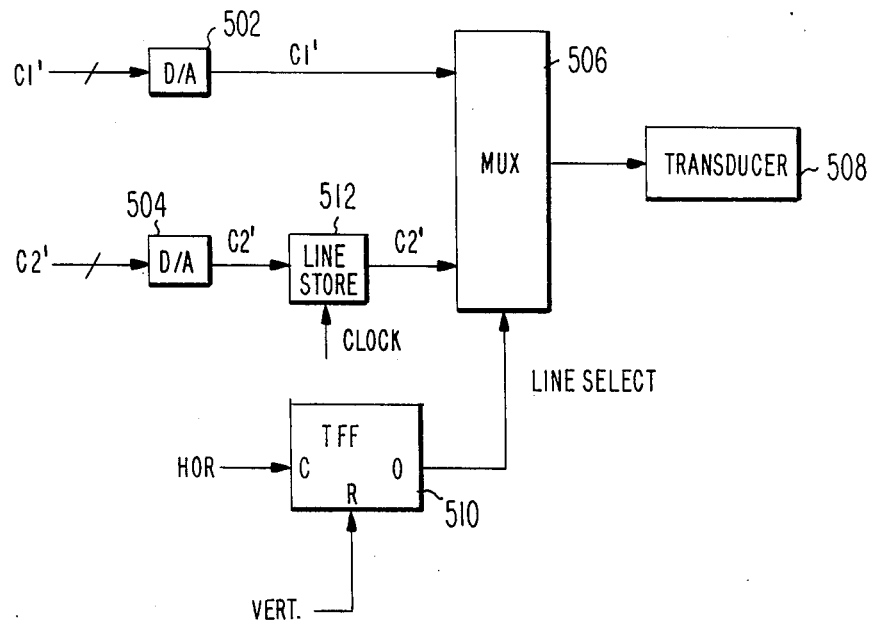
FIG. 8 shows a magnetic tape recording arrangement for recording the television signal format shown in FIG. 4.

The structure of FIG. 8 is arranged to process the digital C1' and C2' samples produced by digital alternate pixel, alternate line selector 100 shown in FIG. 1 assuming the recording will take place in analog form and therefore includes D/A converters. Of course if the recording is in digital form the conversion is not necessary. A similar arrangement can be employed (without the D/A converters) in FIG. 8 to process the analog C1' and C2' signal produced by analog selector 100 shown in FIG. 6a.

Specifically, with respect to the structure shown in FIG. 8, digital C1' and C2' samples are converted to analog form by D/A converters 502 and 504, respectively. During each odd line, when both of the analog signals C1' and C2' are simultaneously produced, analog signal C1' is coupled by a multiplexer 506 to a transducer 508 for recording on the magnetic tape in response to the high logic level of a line select signal produced by a toggle FF 510 and analog signal C2' is coupled to analog line store 512 for storage. During each even line, when neither of signals C1' and C2' is produced, the C2' signal stored in line store 512 during the previous odd line is coupled by multiplexer 506 to transducer 508 for recording in response to the low logic level of the line select signal. Thus, the C1' and C2' signals are alternately recorded during successive lines.

As earlier explained, the digital and analog decoder structures shown in FIG. 5b and 6b, respectively are arranged to process the C1' and C2' signals simultaneously. Therefore, for processing in those decoders, the line-alternately recorded C1' and C2' signal should be converted to simultaneously occurring signals. This may be accomplished by a structure like that shown in FIG. 8 but operated in a reverse manner. That is, storing the recorded C1' in a line store as it is played back during odd lines and reading it out simultaneously as the C2' signal is played back during even lines. It is noted however, that since the decoder structures shown in FIGS. 5b and 7b are intended to process sequentially occurring C1' and C2' signals, these structures avoid the need for the playback decoding structure described above. A suitable delay element should be provided for the Y signal to reestablish correct timing.

The same type of apparatus described for recording may be used for transmission.

While the present invention has been described in terms of specific embodiments, it will be appreciated that modifications may be made to those embodiments. For example, while the progressive scanning camera has been described as sanning the image in horizontal lines, it may as well scan the image in vertical lines. Further, while two specific signal formats have been described, others are possible. For example, it will be readily appreciated that the odd and even pixel and line assignments may be changed. By way of further example, the positions of C1 and C2 in the signal format shown in FIG. 5 may be shifted to be in vertical alignment. This would simplify the encoding and decoding structures since the horizontal shift shown in FIG. 5 would not have to be accounted for. Still further, while in the described decoding structures, the missing pixels and missing lines have been interpolated by forming the average of the nearest two adjacent elements, other higher order forms of interpolation (utilizing more than two elements) may be employed. On the other hand, the missing elements may be simply replaced by replicas of adjacent elements. These and other modifications are intended to be within the scope of the invention defined by the following claims.

What is claimed is:

1. Television production apparatus comprising:
imaging means for progressively scanning an image to form color-representative baseband signals which are each organized in a progressive manner with spatially adjacent scanning lines temporally in the same field whereby each frame of the image consists of a single field;
matrix means responsive to said progressively organized color-representative signals for producing a luminance signal and first and second color-difference signals which are also organized in said progressive manner;
a transmission medium;
first chrominance coupling means coupled between said matrix means and said transmission medium for coupling first and second bandwidth-reduced color-difference signals with bandwidths substantially reduced compared with the bandwidth of said luminance signal produced by said matrix means but also organized in said progressive manner to said transmission medium; said first chrominance coupling means including first bandwidth reducing means for reducing the resolution of said first and second color-difference signals in the scanning line direction, and second bandwidth reducing means for reducing the resolution of said first and second color-difference signals in the direction othogonal to said scanning line direction; and
first luminance coupling means coupled between said matrix and said transmission medium for coupling said luminance signal produced by said matrix means substantially unaltered in bandwidth and still organized in said progressive manner to said transmission medium.

2. Apparatus as recited in claim 1, wherein:
said first bandwidth reducing means includes sampling means for forming samples of said first and second color-difference signals corresponding to picture elements (pixels); and pixel selector means for deleting alternate pixel samples of both said first and second color-difference signals; and
said second bandwidth reducing means includes line selector means for deleting alternate lines of both of said first and second color-difference signals.

3. Apparatus as recited in claim 2, wherein:
said line selector means deletes one of the odd or even lines of both of first and second color-difference signals.

4. Apparatus as recited in claim 2, wherein:
said line selector means deletes even lines of said first color-difference signal and odd lines of said second color-difference signal.

5. Apparatus as recited in claim 2, wherein
said pixel selector means deletes one of the odd or even pixels of both of said first and second color-difference signals.

6. Apparatus as recited in claim 2, wherein:
said pixel selector means deletes even pixels of said first color-difference signal and odd pixels of said second color-difference signal.

7. Apparatus as recited in claim 2, further including:
utilization means;
second chrominance coupling means coupled between said transmission medium and said utilization means for coupling first and second bandwidth-restored color-difference signals with bandwidths substantially increased compared with the bandwidths of said first and second bandwidth-reduced color-difference signals received from said transmission medium but also organized in said progressive manner to said utilization means; said second chrominance coupling means including pixel replacement means for replacing missing pixels of said first and second bandwidth-reduced color-difference signals from information derived from pixels adjacent to said missing pixels; and line replacement means for replacing missing lines of said first and second bandwidth-reduced color-difference signals from information derived from lines adjacent to said missing lines; and
second luminance coupling means coupled between said transmission medium and said utilization means for coupling said luminance signal received from said transmission medium to said utilization means; said second luminance coupling means including delay means for imparting a time delay to said luminance signal corresponding to the time delay imparted to said first and second bandwidth-reduced color-difference signals by said second chrominance coupling means.

8. Apparatus as recited in claim 7, wherein
said utilization means includes color keying apparatus.

9. Apparatus as recited in claim 1, wherein:
said first bandwidth reducing means includes low pass filter means for reducing the bandwidth of said first and second color-difference signals relative to the bandwidth of said luminance signal; and
said second bandwidth reducing means includes line selector means for deleting alternate lines of both of said first and second color-difference signals.

10. Apparatus as recited in claim 9, wherein:
said line selector means deletes one of the odd or even lines of both of first and second color-difference signals.

11. Apparatus as recited in claim 9, wherein:
said line selector means deletes even lines of said first color-difference signal and odd lines of said second color-difference signals.

12. Apparatus as recited in claim 9, further including:
utilization means;

second chrominance coupling means coupled between said transmission medium and said utilization means for coupling first and second bandwidth-restored color-difference signals means with bandwidths substantially increased compared with the bandwidths of said first and second bandwidth-reduced color-difference signals received from said transmission medium but also organized in said progressive manner to said utilization means; said second chrominance coupling means including line replacement means for replacing missing lines of said first and second bandwidth-reduced color-difference signals from information derived from lines adjacent to said missing lines; and second luminance coupling means coupled between said transmission medium and said utilization means for coupling said chrominance signal received from said transmission medium to said utilization means; said second luminance coupling means including delay means for imparting a time delay to said luminance signal corresponding to the time delay imparted to said first and second bandwidth reduced color-difference signals by said second chrominance coupling means.

13. Apparatus as recited in claim 12, wherein:
said utilization means includes color keying apparatus.

14. A method of producing television signals for use in a studio production facility comprising the steps of:
progressively scanning an image to form color-representative baseband signals which are each organized in a progressive manner with spatially adjacent scanning lines temporally in the same field whereby each frame of the image consists of a single field;

matrixing said progressively organized color-representative signals to produce a luminance signal and first and second color-difference signals which are also organized in said progressive manner;

substantially reducing the resolution of said first and second color-difference signals compared with the resolution of said luminance signal in the scanning line direction and in the direction othogonal to said scanning line direction to produce first and second bandwidth-reduced color-difference signals which are also organized in said progressive manner; and recording said luminance signal substantially unaltered in bandwidth and said first and second bandwidth-reduced color-difference signals all while still organized in said progressive manner on a recording medium.

15. The method as recited in claim 14, wherein:
said reducing steps includes the step of deleting alternate lines of both of said first and second color-difference signals.

16. The method as recited in claim 15, wherein:
in said reducing step, one of the odd or even lines of both of first and second color-difference signals are deleted.

17. The method as recited in claim 15, wherein:
in said reducing step, even lines of said first color-difference signal are deleted and odd lines of said second color-difference signals are deleted.

18. The method as recited in claim 15, wherein:
said reducing step includes the steps of forming samples of said first and second color-difference signals corresponding to picture elements (pixels); and deleting alternate pixel samples of both of said first and second color-difference signals.

19. The method as recited in claim 15, wherein:
said reducing step includes the steps of forming samples of said first and second color-difference signals corresponding to picture elements (pixels), and deleting the even pixels of said first color-difference signal and the odd pixels of said second color-difference signal.

20. The method as recited in claim 18, wherein:
in said reducing step, even pixels of said first color-difference signals are deleted and odd pixels of said second color-difference signals are deleted.

* * * * *